(12) United States Patent
Kume et al.

(10) Patent No.: US 10,406,941 B2
(45) Date of Patent: Sep. 10, 2019

(54) SEAT SLIDING DEVICE FOR VEHICLE

(71) Applicant: AISIN SEIKI KABUSHIKI KAISHA, Kariya-shi (JP)

(72) Inventors: Sho Kume, Toyota (JP); Hideki Fujisawa, Chiryu (JP); Naoaki Hoshihara, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/768,688

(22) PCT Filed: Nov. 4, 2016

(86) PCT No.: PCT/JP2016/082725
§ 371 (c)(1),
(2) Date: Apr. 16, 2018

(87) PCT Pub. No.: WO2017/078116
PCT Pub. Date: May 11, 2017

(65) Prior Publication Data
US 2018/0272897 A1  Sep. 27, 2018

(30) Foreign Application Priority Data
Nov. 6, 2015 (JP) .................................. 2015-218959

(51) Int. Cl.
*B60N 2/07* (2006.01)
*B60N 2/08* (2006.01)

(52) U.S. Cl.
CPC ......... *B60N 2/0722* (2013.01); *B60N 2/0818* (2013.01); *B60N 2/0825* (2013.01); *B60N 2/0875* (2013.01)

(58) Field of Classification Search
CPC .. B60N 2/0818; B60N 2/0875; B60N 2/0705; B60N 2/0881; B60N 2/0722; B60N 2/07
(Continued)

(56) References Cited

U.S. PATENT DOCUMENTS 6,688,574 B2 * 2/2004 Okazaki ............... B60N 2/0705
248/424
7,147,195 B2 * 12/2006 Danjo ................... B60N 2/072
248/430
(Continued)

FOREIGN PATENT DOCUMENTS

| JP | 2010-221936 A | 10/2010 |
|---|---|---|
| JP | 4945168 B2 | 6/2012 |
| JP | 5463707 B2 | 4/2014 |

OTHER PUBLICATIONS

International Search Report dated Jan. 31, 2017 in PCT/JP2016/082725 filed Nov. 4, 2016.
(Continued)

*Primary Examiner* — Muhammad Ijaz
(74) *Attorney, Agent, or Firm* — Oblon, McClelland, Maier & Neustadt, L.L.P.

(57) ABSTRACT

A seat sliding device for a vehicle includes a sliding load adjusting mechanism. The sliding load adjusting mechanism includes a support member, which is fixed to a first rail that is one of a lower rail and an upper rail, and a pressing member, which is movably supported by the support member. The pressing member changes a frictional force that is generated between the pressing member and a second rail, which is the other one of the lower rail and the upper rail, in accordance with a pressing force applied to the second rail. The pressing force changes in accordance with the position of the pressing member in relation to the support member. As the upper rail moves in a first direction, the pressing member moves toward a side on which the pressing force is reduced.

10 Claims, 3 Drawing Sheets

(58) Field of Classification Search
USPC .............. 248/424, 425, 429, 430; 296/65.13, 296/65.14, 65.15; 267/33
See application file for complete search history.

(56) References Cited

U.S. PATENT DOCUMENTS

| | | | | |
|---|---|---|---|---|
| 9,238,422 | B2* | 1/2016 | Yamada | B60N 2/07 |
| 2011/0012005 | A1* | 1/2011 | Jahner | B60N 2/0806 |
| | | | | 248/429 |
| 2012/0145866 | A1* | 6/2012 | Fukuda | B60N 2/0705 |
| | | | | 248/429 |
| 2014/0110554 | A1* | 4/2014 | Oya | B60N 2/0705 |
| | | | | 248/430 |
| 2014/0224954 | A1* | 8/2014 | Oh | B60N 2/0705 |
| | | | | 248/429 |
| 2014/0263920 | A1* | 9/2014 | Anticuar | B60N 2/0705 |
| | | | | 248/429 |
| 2017/0368963 | A1* | 12/2017 | Watanabe | B60N 2/0881 |
| 2018/0009337 | A1* | 1/2018 | Kimura | B60N 2/0715 |
| 2018/0229626 | A1* | 8/2018 | Sprenger | B60N 2/0818 |
| 2018/0272897 | A1* | 9/2018 | Kume | B60N 2/0722 |

OTHER PUBLICATIONS

International Preliminary Report on Patentability dated Jan. 31, 2017 in PCT/JP2016/082725 (submitting English translation only), 5 pages.

* cited by examiner

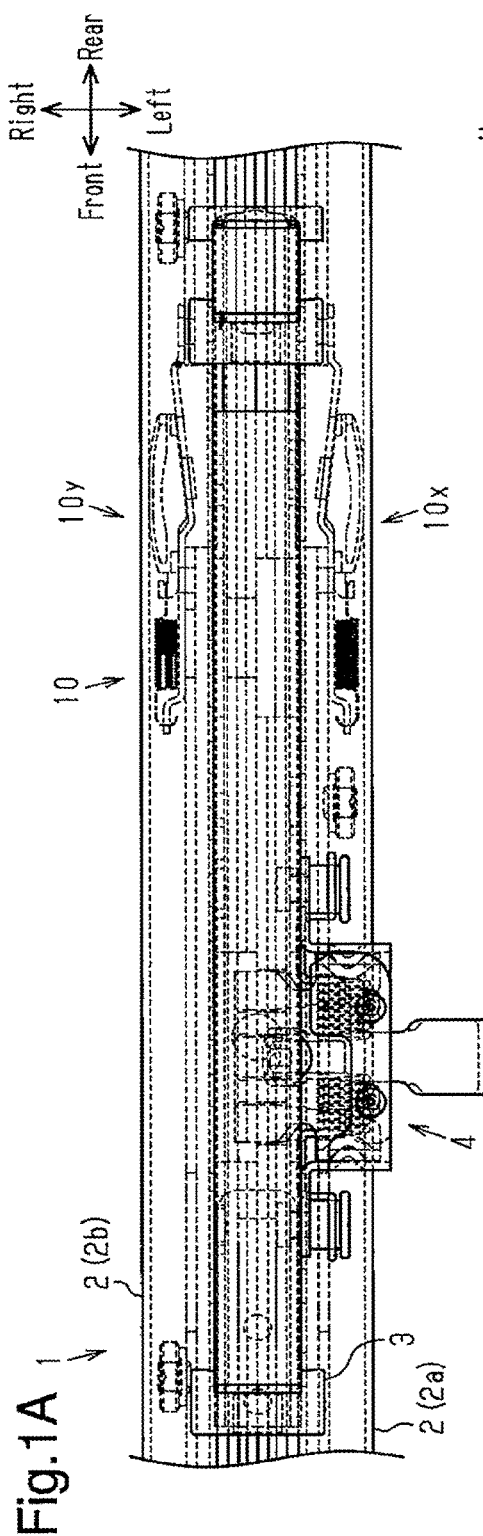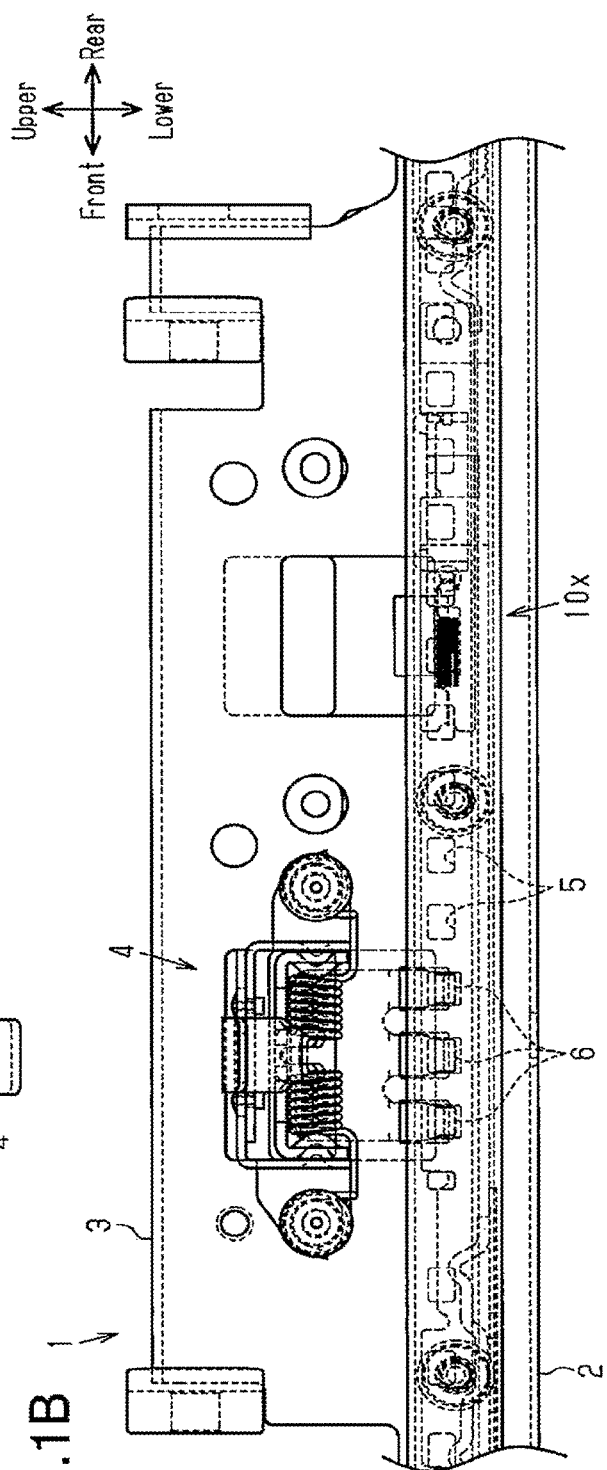

//SEAT SLIDING DEVICE FOR VEHICLE

CROSS-REFERENCE TO RELATED APPLICATIONS

This application is a United States national stage application of International Application No. PCT/JP2016/082725, filed Nov. 4, 2016, which designates the United States, and claims priority to Japanese Patent Application No. 2015-218959, filed Nov. 6, 2015, and the entire contents of each of the above applications are hereby incorporated herein by reference in entirety.

TECHNICAL FIELD

The present invention relates to a seat sliding device for a vehicle.

BACKGROUND ART

Conventionally, the seat sliding device used in a rear seat of a vehicle having three-row seats has lower rails that are inclined such that the front side is lower than the rear side. In contrast, the seat sliding device used in a front seat such as a driver's seat has lower rails that are inclined such that the rear side is lower than the front side. In a seat sliding device with inclined lower rails as mentioned above, the force (load) required to slide the seat forward when adjusting the seat position forward is different from the force (load) required to slide the seat rearward when adjusting the seat position rearward.

The vehicle seat sliding device of Patent Document 1 has lower rails inclined such that the rear side is lower than the front side and also has a slide resistance adjusting mechanism. The slide resistance adjusting mechanism has multiple protrusions, which are provided on the lower rails, and balls, which are arranged on the upper rails and pressed against the protrusions by compression springs. Each protrusion has an inclined surface, against which the ball abuts when the upper rail is slid forward (upward), and a resistance surface, against which the ball abuts when the upper rail is slid rearward (downward). The inclination angle of the resistance surface with respect to the sliding direction of the upper rail is greater than that of the inclined surface. When the upper rail is slid, the ball goes over the protrusion. The resistance applied to the ball by the resistance surface when going over the protrusion due to rearward movement of the upper rail is greater than the resistance applied to the ball by the inclined surface when going over the protrusion due to the forward movement of the upper rail. This equalizes the force (load) required to slide the seat forward and the force (load) required to slide the seat rearward.

PRIOR ART DOCUMENT

Patent Document

Patent Document 1: Japanese Patent No. 4945168

SUMMARY OF THE INVENTION

Problems that the Invention is to Solve

In the vehicle seat sliding device of Patent Document 1, the resistance between the ball and the protrusion disappears at the moment the ball has gone over the protrusion. That is, in the process of sliding the seat, the resistance received by the ball is not constant and the load required to slide the seat is not stable, so it is difficult to finely adjust the position of the seat.

Accordingly, it is an objective of the present invention to provide a vehicle seat sliding device that allows the position of the seat to be adjusted easily.

Means for Solving the Problems

To achieve the foregoing objective, a seat sliding device for a vehicle is provided that includes a lower rail, an upper rail, which is coupled to the lower rail such that the upper rail is movable in a first direction and a second direction opposite to the first direction, and a sliding load adjusting mechanism, which changes a sliding load of the upper rail in accordance with a moving direction of the upper rail. The sliding load adjusting mechanism includes a support member, which is fixed to a first rail that is one of the lower rail and the upper rail, and a pressing member, which is movably supported by the support member and is configured to press a second rail, which is the other one of the lower rail and the upper rail, and to change a frictional force that is generated between the pressing member and the second rail in accordance with a pressing force applied to the second rail. The support member supports the pressing member such that: the pressing force of the pressing member changes in accordance with a position of the pressing member in relation to the support member; as the upper rail moves in the first direction, the pressing member moves toward a side on which the pressing force is reduced; and as the upper rail moves in the second direction, the pressing member moves toward a side on which the pressing force is increased.

BRIEF DESCRIPTION OF THE DRAWINGS

FIG. 1A is a plan view showing the configuration of a part of a seat sliding device according to a first embodiment.

FIG. 1B is a side view of the seat sliding device shown in FIG. 1A.

MODES FOR CARRYING OUT THE INVENTION

First Embodiment

Figure 2A:
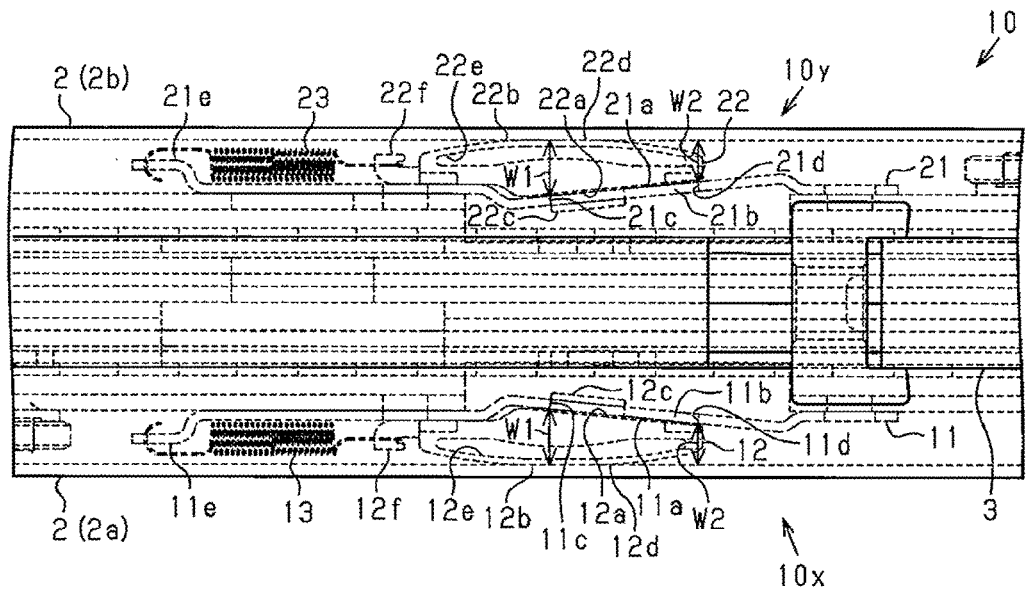
FIG. 2A is an enlarged plan view of a sliding load adjusting mechanism, illustrating a state in which the upper rail is moved rearward.

A vehicle seat sliding device according to a first embodiment will now be described with reference to the drawings.

As shown in FIGS. 1A and 1B, a vehicle seat sliding device 1 includes a lower rail 2, which is fixed to the vehicle floor, an upper rail 3, which is coupled to the lower rail 2, and a lock mechanism 4. The upper rail 3 is displaceable relative to the lower rail 2. The seat is fixed to the upper rail 3. The lock mechanism 4 is attached to the upper rail 3. The lock mechanism 4 has engaging claws 6, which are switched between the state engaged with engagement holes 5 arranged in the longitudinal direction of the lower rail 2, and the disengaged state through operation of a lever (not shown). When the engaging claws 6 are engaged with the engagement holes 5, the lock mechanism 4 is locked, and when the engaging claws 6 leave the engagement holes 5, the lock mechanism 4 is unlocked. Relative displacement of the upper rail 3 with respect to the lower rail 2 is restricted when the lock mechanism 4 is in the locked state and is permitted when the lock mechanism 4 is in the unlocked state. Since the configuration and operation of the lock mechanism 4 are known in the art, detailed description thereof will be omitted.

<Sliding Load Adjusting Mechanism>

As shown in FIGS. 1A, 1B, 2A, and 2B, the seat sliding device 1 is provided with a sliding load adjusting mechanism 10. The sliding load adjusting mechanism 10 includes a first load adjusting portion 10$x$ and a second load adjusting portion 10$y$, which are respectively provided on the left and right sides of one upper rail 3. That is, the sliding load adjusting mechanism 10 includes a first load adjusting portion 10$x$ attached to the left side of the upper rail 3 and a second load adjusting portion 10$y$ attached to the right side of the upper rail 3. The first and second load adjusting portions 10$x$, 10$y$ are symmetric with respect to a line when seen from above (see FIGS. 2A and 2B).

The first load adjusting portion 10$x$ includes a fixed bracket 11, a slider member 12, and a tension coil spring 13. Likewise, the second load adjusting portion 10$y$ includes a fixed bracket 21, a slider member 22, and a tension coil spring 23.

Each of the fixed brackets 11, 21 is a plate extending in the front-rear direction and is fixed to the upper rail 3 such that its principal planes face in the left-right direction. The fixed bracket 11 is fixed to the left side surface of the upper rail 3 and the fixed bracket 21 is fixed to the right side surface of the upper rail 3. Further, the fixed bracket 11 has a linear inclined portion 11$a$, which extends rearward and obliquely leftward, and the fixed bracket 21 has a linear inclined portion 21$a$, which extends rearward and obliquely rightward. Therefore, the distance between each inclined portion 11$a$, 21$a$ and the corresponding side wall portion 2$a$, 2$b$ of the lower rail 2 facing the inclined portion 11$a$, 21$a$ becomes wider toward the front side (distance W1) and narrower toward the rear side (distance W2). That is, the distance between each inclined portion 11$a$, 21$a$ and the corresponding side wall portion 2$a$, 2$b$ of the lower rail 2 gradually changes in the moving direction of the upper rail 3. The inclined portions 11$a$, 21$a$ are provided with narrow guide portions 11$b$, 21$b$, which are formed by cutting out the small sections from the upper edges of the inclined portions 11$a$, 21$a$. The guide portions 11$b$, 21$b$ have front stopper portions 11$c$, 21$c$ at the front ends and rear stopper portions 11$d$, 21$d$ at the rear ends. The fixed brackets 11, 21 have spring attaching portions 11$e$, 21$e$ at the foremost sections for attaching the front ends (first ends) of the tension coil springs 13, 23.

The slider members 12, 22 are respectively arranged between the fixed brackets 11, 21 and the lower rail 2. The slider members 12, 22 have sliding contact portions 12$a$, 22$a$, which are inclined along the inclined portions 11$a$, 21$a$ of the fixed brackets 11, 21 and are in sliding contact with the inclined portions 11$a$, 21$a$, and pressing portions 12$b$, 22$b$, which are opposed to the side wall portions 2$a$, 2$b$ of the lower rail 2 on the side opposite to the sliding contact portions 12$a$, 22$a$ and generate pressing force according to the circumstances. The slider members 12, 22 are supported by the guide portions 11$b$, 21$b$ of the fixed brackets 11, 21 with attachment pieces 12$c$, 22$c$ provided on the sliding contact portions 12$a$, 22$a$ and are supported movably in the front-rear direction between the front stopper portions 11$c$, 21$c$ and the rear stopper portions 11$d$, 21$d$. The pressing portions 12$b$, 22$b$ have arch portions 12$d$, 22$d$ bulging outward (curved outer surfaces) at the center in the front-rear direction, and spaces 12$e$, 22$e$ are provided inside the respective arch portions 12$d$, 22$d$. The slider members 12, 22 have spring attaching portions 12$f$, 22$f$ at the foremost sections for attaching the rear ends (second ends) of the tension coil springs 13, 23.

The tension coil springs 13, 23 are arranged such that the winding axes face substantially in the front-rear direction. The front ends of the tension coil springs 13, 23 are attached to the spring attaching portions 11$e$, 21$e$ of the fixed brackets 11, 21. The rear ends of the tension coil springs 13, 23 are attached to the spring attaching portions 12$f$, 22$f$ of the slider members 12, 22. The tension coil springs 13, 23 generate urging force for moving the slider members 12, 22 forward.

<Operation of Sliding Load Adjusting Mechanism>

Operation of the sliding load adjusting mechanism 10 will now be described.

As shown in FIG. 2A, in the initial state of the first and second load adjusting portions 10$x$, 10$y$ of the sliding load adjusting mechanism 10, the slider members 12, 22 receive the tensile force of the tension coil springs 13, 23 and are located at the front end positions (initial positions), at which the load adjusting portions 10$x$, 10$y$ are in contact with the stopper portions 11$c$, 21$c$. At this time, the pressing portions 12$b$, 22$b$ of the slider members 12, 22 are in contact with the side wall portions 2$a$, 2$b$ of the lower rail 2 by small areas.

Then, when the upper rail 3 is displaced rearward with respect to the lower rail 2 so as to slide the seat rearward, the load adjusting portions 10$x$, 10$y$ are also moved rearward. At this time, the slider members 12, 22 are held at the front end positions, which are the initial positions, by the tensile force of the tension coil springs 13, 23 acting on the slider members 12, 22 and the forward frictional force applied to the pressing portions 12$b$, 22$b$ of the slider members 12, 22 due to the sliding contact with the side wall portions 2$a$, 2$b$ of the lower rail 2. That is, when sliding the seat rearward, the force (load) required to slide the seat sliding device 1 rearward is stably small only with a substantially constant slight frictional force generated and received by the pressing portions 12$b$, 22$b$ of the slider members 12, 22.

Figure 2B:
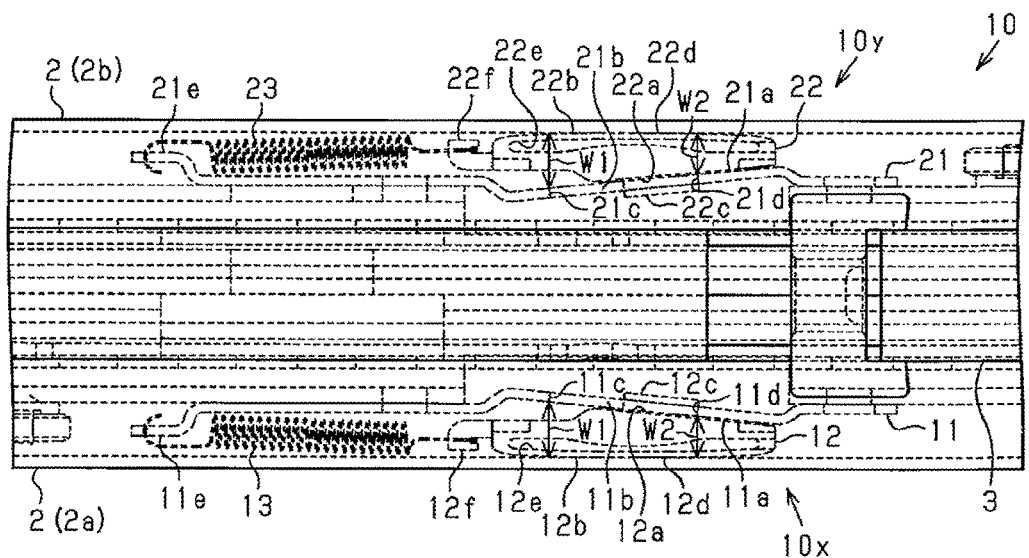
FIG. 2B is an enlarged plan view of the sliding load adjusting mechanism shown in FIG. 2A, illustrating a state in which the upper rail is moved forward.

In contrast, when the upper rail 3 is displaced forward with respect to the lower rail 2 so as to slide the seat forward, the load adjusting portions 10$x$, 10$y$ are also moved forward. At this time, the pressing portions 12$b$, 22$b$ of the slider members 12, 22 receive rearward frictional force due to the sliding contact with the side wall portions 2$a$, 2$b$ of the lower rail 2. The rearward frictional force is set to exceed the tensile force of the tension coil springs 13, 23 acting on the slider members 12, 22, so that the slider members 12, 22 move rearward along the inclined portions 11$a$, 21$a$ (the guide portions 11$b$, 21$b$) of the fixed brackets 11, 21 against the tensile force of the tension coil springs 13, 23. Then, as shown in FIG. 2B, the slider members 12, 22 reach the rear end positions, at which the slider members 12, 22 contact the rear stopper portions 11$d$, 21$d$ and are restricted from moving further rearward. The manner in which the slider members 12, 22 operate may be adjusted as necessary by changing the material and shapes of the slider members 12, 22, the urging force of the tension coil springs 13, 23, the inclined angles of the inclined portions 11$a$, 21$a$ of the fixed brackets 11, 21, and the like.

In a state in which the slider members 12, 22 are located at the rear end positions, the distances between the inclined portions 11a, 21a and the opposed side wall portions 2a, 2b of the lower rail 2 are each the small distance W2. Thus, the arch portions 12d, 22d of the pressing portions 12b, 22b are greatly bent so that the spaces 12e, 22e are slightly left or the central portions of the spaces 12e, 22e disappear completely. Then, the pressing force of the pressing portions 12b, 22b of the slider members 12, 22 pressing the side wall portions 2a, 2b of the lower rail 2 is increased, which increases the frictional force generated in the slider members 12, 22. That is, when sliding the seat forward, the force (load) required to slide the seat sliding device 1 forward is stably great with a substantially constant great frictional force received by the pressing portions 12b, 22b of the slider members 12, 22.

When the forward sliding of the seat is stopped and the displacement of the upper rail 3 is interrupted, the slider members 12, 22 are returned to the front end positions, which are the initial positions, by the tension coil springs 13, 23. When the upper rail 3 is displaced rearward relative to the lower rail 2 from that position again or the upper rail 3 is displaced forward relative to the lower rail 2, the same operation as described is performed.

Since the seat sliding device 1 is configured such that the sliding load adjusting mechanism 10 generates a greater load (frictional force) when moving the upper rail 3 forward than when moving the upper rail 3 rearward, the vehicle user can slide the seat rearward more easily than forward.

In view of the above, if the above-described seat sliding device 1 is used in a case in which the lower rail 2 is inclined such that the front side is lower than the rear side, the gravity component in the extending direction of the lower rail 2 acting on the seat sliding device 1 due to the inclination of the lower rail 2 can be canceled out by the difference in the load (frictional force) generated by the sliding load adjusting mechanism 10 when the upper rail 3 is moved forward and rearward. That is, it is possible to reduce the difference between the forward operating load of the seat, which is required when adjusting the seat position forward, and the rearward operating load of the seat, which is required when adjusting the seat position rearward. Therefore, even if the lower rail 2 is inclined, it is possible to adjust the position of the seat forward and rearward in a similar manner.

As described above, the present embodiment has the following advantages.

(1) The slider members 12, 22 are supported by the fixed brackets 11, 21 such that the positions of the slider members 12, 22 in relation to the fixed brackets 11, 21 are changed by the frictional force applied to the slider members 12, 22 and that the pressing force changes in accordance with the positions of the slider members 12, 22. As the upper rail 3 moves rearward (first direction), the slider members 12, 22 move to the side where the pressing force decreases, that is, the side where the frictional force decreases. As the upper rail 3 moves forward (second direction), the slider members 12, 22 move to the side where the pressing force increases, that is, the side where the frictional force increases. This causes the force (load) required to slide the seat (the upper rail 3) forward and the force (load) required to slide the seat (the upper rail 3) rearward to be different from each other. Therefore, in the case in which the lower rail 2 is installed on the vehicle floor while being inclined, it is also possible to reduce the difference in the force (load) required for the sliding operations between the descending direction and the ascending direction if the sliding load adjusting mechanism 10 is configured such that the frictional force increases when the upper rail 3 (seat) moves in the descending direction and that the frictional force decreases when the upper rail (seat) moves in the ascending direction. Further, almost constant frictional force is continuously generated in the slider members 12, 22 during sliding of the upper rail 3 (seat). This allows the sliding operation to be performed in a stable manner and thus facilitating the position adjustment of the seat.

(2) When the upper rail 3 is moving rearward, the slider members 12, 22 are held in the initial positions by the urging force of the tension coil springs 13, 23, and the pressing force is small. In contrast, when the upper rail 3 is moving forward, the slider members 12, 22 move to positions away from the initial positions against the urging force of the tension coil springs 13, 23, and the pressing force is great. The operation of the slider members 12, 22 is stabilized by the tension coil springs 13, 23, which further stabilizes the operation of the sliding load adjusting mechanism 10.

(3) The slider members 12, 22 have the spaces 12e, 22e inside the pressing portions 12b, 22b, which press the lower rail 2, that is, between the pressing portions 12b, 22b and the sliding contact portions 12a, 22a. This allows the pressing force to be easily set. For example, it is possible to relax the initial change characteristics of the pressing force.

(4) The slider members 12, 22 have pressing surfaces (the outer surfaces of the arch portions 12d, 22d) for pressing the lower rail 2, and these pressing surfaces are curved so as to bulge toward the wall portions of the lower rail 2. This also allows the pressing force to be easily set. For example, it is possible to relax the initial change characteristics of the pressing force.

(5) The fixed brackets 11, 21 have the inclined portions 11a, 21a (the guide portions 11b, 21b) inclined linearly with respect to the moving direction of the upper rail 3, and the slider members 12, 22 are in sliding contact with the inclined portions 11a, 21a. This stabilizes the operation of the slider members 12, 22, thus further stabilizing the operation of the sliding load adjusting mechanism 10.

(6) The moving range of the slider members 12, 22 is limited by the stopper portions 11c, 21c, 11d, 21d provided on the fixed brackets 11, 21. This stabilizes the operation of the slider members 12, 22, thus further stabilizing the operation of the sliding load adjusting mechanism 10.

(7) The sliding load adjusting mechanism 10 has the two load adjusting portions 10x, 10y, which are symmetrical with respect to a line extending in the moving direction of the upper rail 3. This allows the slider members 12, 22 to generate equivalent pressing force (friction force) at multiple positions, which further stabilizes the operation of the sliding load adjusting mechanism 10.

Second Embodiment

A vehicle seat sliding device according to a second embodiment will now be described with reference to the drawings. In the present embodiment, like or the same reference numerals are given to those components that are like or the same as the corresponding components of the first embodiment and detailed explanations are omitted.

<Sliding Load Adjusting Mechanism>

Figure 3A:
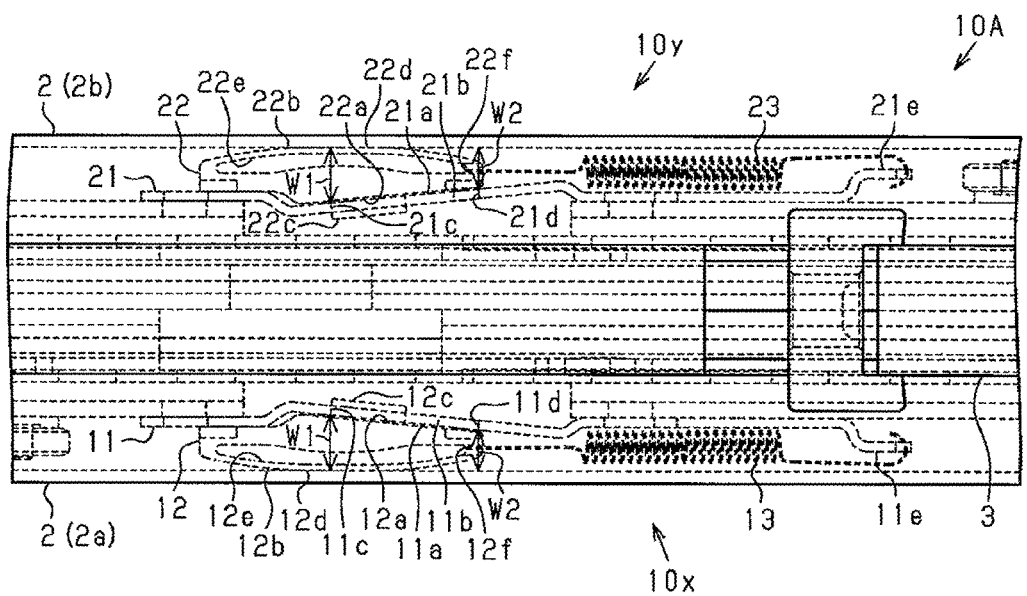
FIG. 3A is an enlarged plan view of a sliding load adjusting mechanism in a seat sliding device according to a second embodiment, illustrating a state in which the upper rail is moved rearward.
Figure 3B:
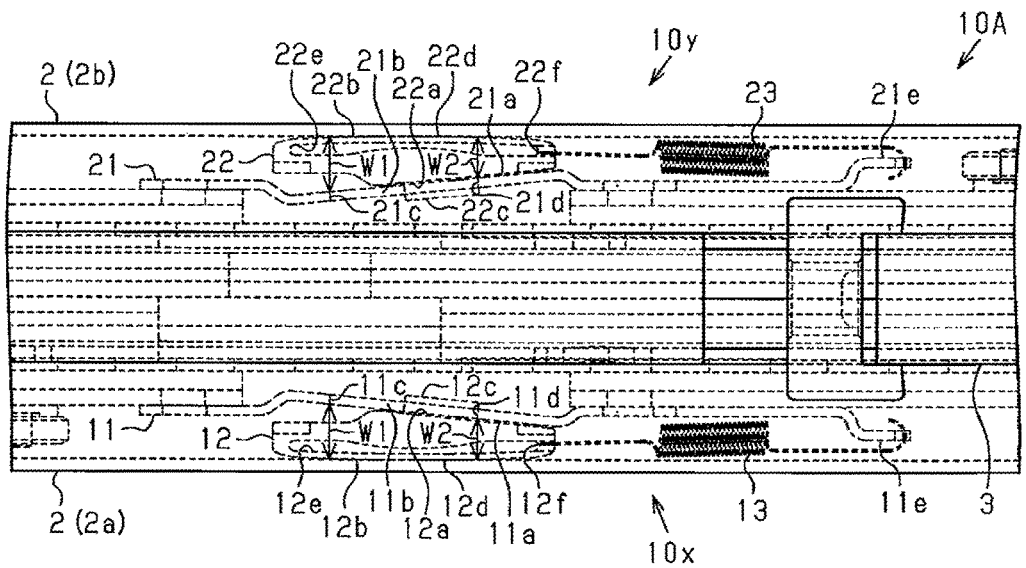
FIG. 3B is an enlarged plan view of the sliding load adjusting mechanism shown in FIG. 3A, illustrating a state in which the upper rail is moved forward.

Contrary to the first embodiment, the tension coil springs 13, 23 are arranged on the rear side of the slider members 12, 22 in a sliding load adjusting mechanism 10A of the present embodiment as shown in FIGS. 3A and 3B. That is, the slider members 12, 22 are arranged at the rear end positions, or the initial positions, at which the slider members 12, 22 contact the rear stopper portions 11d, 21d, by the tensile force of the tension coil springs 13, 23.

<Operation of Sliding Load Adjusting Mechanism>

Operation of the sliding load adjusting mechanism 10A will now be described.

In the initial state of the first and second load adjusting portions 10x, 10y of the sliding load adjusting mechanism 10, the slider members 12, 22 are arranged at the rear end positions (initial positions) shown in FIG. 3B.

When the upper rail 3 is displaced rearward with respect to the lower rail 2 so as to slide the seat rearward, the pressing portions 12b, 22b of the slider members 12, 22 receives forward frictional force due to the sliding contact with the side wall portions 2a, 2b of the lower rail 2. Since the forward frictional force is greater than the tensile force of the tension coil springs 13, 23, the slider members 12, 22 are moved to the front end positions (or the vicinity thereof), at which the slider members 12, 22 abut against the front stopper portions 11c, 21c against the tensile force of the tension coil springs 13, 23, as shown in FIG. 3A This reduces the pressing force with which the pressing portions 12b, 22b of the slider members 12, 22 press the side wall portions 2a, 2b of the lower rail 2, so that only slight frictional force is generated in the pressing portions 12b, 22b of the slider members 12, 22. That is, when sliding the seat rearward, the force (load) required to slide the seat sliding device 1 rearward is stably small only with a substantially constant slight frictional force generated and received by the pressing portions 12b, 22b of the slider members 12, 22.

In contrast, when the upper rail 3 is displaced forward relative to the lower rail 2 so as to slide the seat forward, the slider members 12, 22 are held at the rear end positions, or the initial positions, as shown in FIG. 3B by the tensile force of the tension coil springs 13, 23 acting on the slider members 12, 22 and the rearward frictional force applied to the pressing portions 12b, 22b of the slider members 12, 22 due to the sliding contact with the side wall portions 2a, 2b of the lower rail 2. When the slider members 12, 22 are at the rear end positions, the pressing force with which the pressing portions 12b, 22b press the side wall portions 2a, 2b of the lower rail 2 is great, and the frictional force generated in the pressing portions 12b, 22b of the slider members 12, 22 remains great. That is, when sliding the seat forward, the force (load) required to slide the seat sliding device 1 forward is stably great with a substantially constant great frictional force received by the pressing portions 12b, 22b of the slider members 12, 22.

Thus, although operating inversely to the sliding load adjusting mechanism 10 of the first embodiment, the sliding load adjusting mechanism 10A of the present embodiment is the same as that in the first embodiment in the function of imparting sliding load. The sliding load adjusting mechanism 10A of the present embodiment achieves the same advantages as the advantages (1) to (7) of the sliding load adjusting mechanism 10 of the first embodiment.

The above-described embodiments may be modified as follows.

Although materials of the fixed brackets 11, 21 and the slider members 12, 22 are not specifically mentioned above, these may be made of plastic or metal, or may be made by combining plastic and metal.

In the above-described embodiments, the slider members 12, 22 are provided with the spaces 12e, 22e. However, the spaces 12e, 22e may be omitted so that the slider members 12, 22 (the pressing portions 12b, 22b) are solid.

The above-described embodiments use the tension coil springs 13, 23. However, a different type of spring may be used. Alternatively, the springs may be omitted.

In the above-described embodiments, two load adjusting portions 10x, 10y are provided for each upper rail 3. However, only one load adjusting portion may be provided for each upper rail 3.

In the above-described embodiments, the slider members 12, 22 (the pressing portions 12b, 22b) are brought into contact with the side wall portions 2a, 2b of the lower rail 2. However, the slider members 12, 22 may be brought into contact with other wall portions such as the upper wall portion of the lower rail 2.

In the above-described embodiments, the fixed brackets 11, 21, which are separate members from the upper rail 3, are attached to the upper rail 3. However, the fixed brackets 11, 21 may be provided integrally with the upper rail 3.

In the above-described embodiments, the sliding load adjusting mechanism 10, 10A is attached to the upper rail 3. However, the sliding load adjusting mechanism 10, 10A may be attached to the lower rail 2. Specifically, the fixed brackets 11, 21 may be fixed to the lower rail 2, and the slider members 12, 22, which are movably supported by the fixed brackets 11, 21, may be pressed against the wall portions of the upper rail 3.

In a case in which the lower rail 2 is installed on the vehicle floor such that the front side is higher than the rear side, the sliding load adjusting mechanism 10, 10A may be inverted in the front-rear direction with respect to those in the above-described embodiments.

DESCRIPTION OF THE REFERENCE NUMERALS

2 . . . Lower Rail; 3 . . . Upper Rail; 10, 10A . . . Sliding Load Adjusting Mechanisms; 10x, 10y . . . First and Second Load Adjusting Portions (Pair of Load Adjusting Portions; 11, 21 . . . Fixed Brackets (Support Members); 11a, 21a . . . Inclined Portions; 11c, 21c . . . Front Stopper Portions (Limiting Portions); 11d, 21d . . . Rear Stopper Portions (Limiting Portions); 12, 22 . . . Slider Members (Pressing Members); 12b, 22b . . . Pressing Portions; 12e, 22e . . . Spaces; 13, 23 . . . Tension Coil Springs (Urging Members).

The invention claimed is:

1. A seat sliding device for a vehicle comprising:
a lower rail;
an upper rail, which is coupled to the lower rail such that the upper rail is movable in a first direction and a second direction opposite to the first direction; and
a sliding load adjusting mechanism, which changes a sliding load of the upper rail in accordance with a moving direction of the upper rail, wherein
the sliding load adjusting mechanism includes
    a support member, which is fixed to a first rail that is one of the lower rail and the upper rail, and
    a pressing member, which is movably supported by the support member and is configured to press a second rail, which is the other one of the lower rail and the upper rail, and to change a frictional force that is generated between the pressing member and the second rail in accordance with a pressing force applied to the second rail, and
the support member supports the pressing member such that
    the pressing force of the pressing member changes in accordance with a position of the pressing member in relation to the support member,
    as the upper rail moves in the first direction, the pressing member moves toward a side on which the pressing force is reduced, and as the upper rail moves in the second direction, the pressing member moves toward a side on which the pressing force is increased.

2. The seat sliding device for a vehicle according to claim 1, wherein
the sliding load adjusting mechanism further includes an urging member configured to hold the position of the pressing member in relation to the support member at an initial position,
when the upper rail moves in one of the first and second directions, the urging member holds the pressing member at the initial position, and
when the upper rail moves in the other one of the first and second directions, the pressing member moves to a position away from the initial position against an urging force of the urging member.

3. The seat sliding device for a vehicle according to claim 2, wherein
the pressing member generates a small pressing force at the initial position, and
the pressing member generates a great pressing force at the position away from the initial position.

4. The seat sliding device for a vehicle according to claim 2, wherein
the pressing member generates a great pressing force at the initial position, and
the pressing member generates a small pressing force at the position away from the initial position.

5. The seat sliding device for a vehicle according to claim 1, wherein the pressing member includes
a pressing portion, which presses the second rail, and
a space provided inside the pressing portion.

6. The seat sliding device for a vehicle according to claim 1, wherein
the pressing member includes a pressing surface for pressing the second rail, and
the pressing surface is curved.

7. The seat sliding device for a vehicle according to claim 1, wherein
the support member has an inclined portion that is inclined linearly with respect to the moving direction of the upper rail, and
the pressing member is configured to be in sliding contact with the inclined portion.

8. The seat sliding device for a vehicle according to claim 7, wherein
the pressing member is arranged between the inclined portion and a wall portion of the second rail, and
a distance between the inclined portion and the wall portion of the second rail changes in the moving direction of the upper rail.

9. The seat sliding device for a vehicle according to claim 1, wherein the support member includes a limiting portion, which limits a moving range of the pressing member.

10. The seat sliding device for a vehicle according to claim 1, wherein
the sliding load adjusting mechanism includes two load adjusting portions, which are symmetrical with respect to a line extending in the moving direction of the upper rail, and
each of the load adjusting portions includes the pressing member and the support member.

* * * * *